United States Patent
Krings et al.

(10) Patent No.: US 8,361,670 B2
(45) Date of Patent: Jan. 29, 2013

(54) FLOW CELL AND FLOW PLATE HAVING CATALYST DISPOSED IN MICROREACTION CHAMBERS

(75) Inventors: Norman Krings, Ludwigsburg (DE); Juergen Hackenberg, Sachsenheim (DE); Alexander Reitzle, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 981 days.

(21) Appl. No.: 12/338,500

(22) Filed: Dec. 18, 2008

(65) Prior Publication Data

US 2009/0226788 A1 Sep. 10, 2009

(30) Foreign Application Priority Data

Dec. 21, 2007 (DE) .................. 10 2007 062 033

(51) Int. Cl.
*H01M 2/38* (2006.01)
*H01M 2/40* (2006.01)
*H01M 8/24* (2006.01)
*H01M 8/10* (2006.01)
*H01M 8/04* (2006.01)
*H01M 8/00* (2006.01)

(52) U.S. Cl. ........ 429/457; 429/456; 429/483; 429/512; 429/514; 429/535

(58) Field of Classification Search .......... None
See application file for complete search history.

(56) References Cited

U.S. PATENT DOCUMENTS

| | | | | |
|---|---|---|---|---|
| 5,879,827 A * | 3/1999 | Debe et al. | ..................... | 429/524 |
| 6,974,647 B2 * | 12/2005 | Wilkinson et al. | ............ | 429/513 |
| 2003/0194598 A1 * | 10/2003 | Chan | ............................... | 429/40 |
| 2005/0048351 A1 * | 3/2005 | Hood et al. | ..................... | 429/38 |
| 2006/0008696 A1 * | 1/2006 | Cha et al. | ........................ | 429/38 |
| 2006/0080833 A9 * | 4/2006 | Lee et al. | ........................ | 29/890 |
| 2007/0065709 A1 * | 3/2007 | Petrovic et al. | ................. | 429/38 |
| 2009/0202882 A1 * | 8/2009 | Takeguchi et al. | ............. | 429/30 |

FOREIGN PATENT DOCUMENTS

| | | |
|---|---|---|
| DE | 10038589 A1 | 2/2002 |
| DE | 102005025911 A1 | 12/2006 |
| DE | 60123817 T2 | 5/2007 |
| WO | WO2007/116785 | * 10/2007 |

* cited by examiner

*Primary Examiner* — N Drew Richards
*Assistant Examiner* — Michael Jung
(74) *Attorney, Agent, or Firm* — Michael Best & Friedrich LLP

(57) ABSTRACT

The invention relates to a fuel cell, having a first electrode, a second electrode, and a membrane element, in which the membrane element is disposed between the first electrode and the second electrode. At least one of the electrodes has a flow field plate and at least one flow conduit, through which a reactant can be conducted, extends in at least one outer surface of the flow field plate. According to the invention, it is provided that the flow field plate has at least one microreaction chamber, and the microreaction chamber is disposed in the outer surface and on the flow conduit. A catalyst is disposed on at least a part of the microreaction chamber in such a way that the catalyst has contact simultaneously with the membrane element and the inflowing reactant.

8 Claims, 6 Drawing Sheets

FLOW CELL AND FLOW PLATE HAVING CATALYST DISPOSED IN MICROREACTION CHAMBERS

CROSS-REFERENCE TO RELATED APPLICATIONS

This application is based on German Patent Application 10 2007 062 033.2 filed Dec. 21, 2007, upon which priority is claimed.

BACKGROUND OF THE INVENTION

1. Field of the Invention

The present invention relates to a fuel cell, having a first electrode, a second electrode, and a membrane element, in which the membrane element is disposed between the first electrode and the second electrode, at least one of the electrodes has a flow field plate, and at least one flow conduit through which a reactant can be conducted extends in at least one outer surface of the flow field plate. The invention moreover relates to a flow field plate. The invention relates as well to a method for producing a flow field plate for use in a fuel cell.

2. Description of the Prior Art

Known fuel cells serve to convert hydrogen into usable electrical energy. To perform this electrochemical reaction, the fuel cell has two electrodes, at which two reactants, such as hydrogen and oxygen, are delivered to the fuel cell. The hydrogen delivered to one electrode—the anode—splits, yielding electrons in the form of $H^+$ ions. While the electrons can be used, via an external current circuit, for generating energy, the protons diffuse through a membrane element to the second electrode—the cathode. At the cathode, a reaction of the protons with oxygen can then ensue, thereby producing water. Between each of the electrodes and the membrane element is a respective gas diffusion layer. This gas diffusion layer has the function of distributing the fuels, that is, hydrogen or oxygen, uniformly over the entire surface of the electrodes and to remove the products of the reaction, that is, current, heat, and water, from the electrodes. To speed up the reaction of the fuels at the electrodes, a catalyst can be introduced into the gas diffusion layer. If the catalyst is to be active in the fuel cell, the individual particles of the catalyst must be in contact with the membrane element and one of the fuels, and they must also be electrically conductively connected to the current collector element. If on or more of these conditions is not met, the catalyst particle is not active. Since the gas diffusion layer is typically produced from relatively coarse graphite fibers and the catalyst is introduced into deep regions of the gas diffusion layer as well, contact between the membrane element, the catalyst and the fuel cannot always be assured. As a result, a large proportion of the introduced catalyst is inactive.

OBJECT AND SUMMARY OF THE INVENTION

The object of the present invention is to furnish a fuel cell which is simple in its construction, requires little space, and enables effective utilization of the catalyst.

This object is advantageously attained by a fuel cell according to the invention and by a method for producing a flow field plate according to the invention. In addition, the object is advantageously attained by a flow field plate for a fuel cell according to the invention. Characteristics and details that are described in conjunction with the fuel cell of the invention and the flow field plate of the invention are understood to apply in conjunction with the method of the invention, and vice versa. The characteristics in the description can each be essential to the invention both individually and in arbitrary combination.

According to the invention, it is provided that the flow field plate has at least one microreaction chamber, and the microreaction chamber is disposed in the outer surface and on the flow conduit; and a catalyst is disposed on at least a part of the microreaction chamber in such a way that the catalyst has contact simultaneously with the membrane element and the inflowing reactant.

The nucleus of the invention is the introduction of microreaction chambers into the flow field plate. By the connection of the microreaction chambers to the flow conduit, it is assured that the reactant will flow into the microreaction chamber. As a result, the volume available to the reactant for a reaction with the catalyst is increased.

On the other hand, the fuel cell of the invention contains a catalyst, which is disposed on at least a part of the microreaction chamber. By the direct positioning of the catalyst on the outer surface of the flow field plate, the electrical contact between the three elements needed for generating electric current, that is, the membrane element, the catalyst and the reactant, is assured. This has the advantage for the resultant invention that by the shift of the catalyst from the gas diffusion layer to the flow field plate, the gas diffusion layer is no longer required and can be dispensed with as a component in the fuel cell. Consequently, the fuel cell disclosed here can be produced more easily and less expensively, without loss of performance.

A first variant embodiment of the fuel cell of the invention is distinguished in that the catalyst is disposed on at least part of a peripheral region of the microreaction chamber. In the context of the invention, the peripheral region is preferably meant as that part of the microreaction chamber which is in direct mechanical contact with the membrane element. The peripheral regions can thus preferably be those edges of the microreaction chamber on which the membrane element rests. Thus direct contact among the reactant, the membrane element, and the catalyst is assured. The variant embodiment described has the advantage that only a very slight amount of catalyst is needed, yet is efficiently used.

The reactants, such as hydrogen and oxygen, and the reaction product, water, flow through the flow conduit on an outer surface of the flow field plate. The reactants primarily serve to generate electrical energy electrochemically. Since this electrochemical reaction is an exothermal reaction, the fluids are at the same time used for dissipating excess heat of reaction. It has therefore proved to be advantageous if the flow conduits on the outer surface of the flow field plate have a meandering structure. In this arrangement, the flow conduits cover a large proportion of the surface of the flow field plate.

In a further advantageous variant embodiment, it is provided that the flow field plate has a stabilizing structure, and the stabilizing structure supports the membrane element. The stabilizing structure serves the purpose of mechanically supporting the membrane element inside the fuel cell. It has proved advantageous if the stabilizing structure is shaped from the lateral boundary walls of the flow conduits and/or of the microreaction chambers. Hence the membrane element covers the flow conduits and is thus in direct contact with the catalyst element and the inflowing reactant. To enable easy production, the flow conduits can be incorporated into the flow field plate. In that case, the remaining components of the flow field plate form the stabilizing structure, onto which the membrane element can be placed.

In a further advantageous embodiment, the first electrode can be shaped as an anode plate. In a fuel cell that is operated with oxygen and hydrogen as reactants, the anode receives the hydrogen gas, and the cathode receives oxygen, which is supplied in particular from the ambient air. The hydrogen gas is split in the anode, to generate free protons and electrons. Through the electrolyte, the protons reach the cathode, where they react with the oxygen and the electrons to produce water. The electrons from the anode cannot pass through the electrolyte, since the electrolyte is an insulator. It is consequently possible to carry these electrons through a load, in which the electrons perform a desired task. Since the power produced by a fuel cell is often inadequate, a plurality of fuel cell units is combined in one fuel cell. In individual fuel cell units that are used in fuel cell operation and that serve to convert hydrogen and oxygen, the voltage furnished is theoretically approximately 1.23 volts at a temperature of 25° C. However, this theoretical value is often not reached in practice, since the voltage depends on the fuel, on the type and quality of the cell, and on the temperature and the electrical load. To obtain a higher voltage, a plurality of fuel cell units can be disposed in the fuel cell. A series circuit of fuel cell units, in particular, results in a powerful fuel cell.

When a plurality of fuel cell units are used, it has proved advantageous to combine one anode and one cathode each to form a bipolar plate. Such bipolar plats can comprise graphite or corrosion-proof metal. The bipolar plates are integrally joined to the flow field plate and thus assure the distribution of the fuels over the active surface area of the electrodes. They also provide for the mechanical stability of the fuel cell. Since in fuel cell operation heat can also be produced, large fuel cells are made with bipolar plates that have holes drilled in them, so that they can be cooled from the inside with water.

A further advantageous embodiment of the fuel cell of the invention is distinguished in that the flow field plate has at least one flow guide, and the flow guide assures an oncoming flow to the microreaction chamber. The flow guide can for instance be disposed in the flow conduits and can thus conduct the current of the inflowing reactant into the microreaction chambers. So that the full flow of the reactant through the flow field plate is not hindered unnecessarily, it has proved advantageous to disposed the flow guide on only the outer sides of the flow conduits. In those regions, the speed of the reactant is less than in the middle of the flow conduit. This has the further advantage that the flow guide need not have particularly great mechanical stability. It suffices for small, spoilerlike flow guides to be integrated onto or into the side walls of the flow conduits and thus to provided for a uniform oncoming flow to the microreaction chambers.

To make a homogeneous reaction of the reactants at the catalyst possible, it has proved advantageous to embody the microreaction chambers as elongated conduit structures. These conduit structures can preferably be incorporated into the stabilizing structure of the flow field plate and can be in direct contact with the flow conduits. Based on hydrodynamic aspects, it has proved advantageous for the microreaction chambers to be disposed in a V shape relative to the flow conduits. This assures that the reactants can easily flow into the microreaction chambers, since only a slight change in the flow direction is needed.

A further advantageous embodiment of the fuel cell of the invention is distinguished in that the microreaction chambers have an arrangement on the flow field plate that is similar to an organic structure, in particular a human lung. The microreaction chambers can moreover have a fractal arrangement and/or fractal geometry, so as to cover the outside of the flow field plate in the region between the flow conduits. Such arrangements lead to a very efficient, large-area distribution of the fuel over the outside of the flow field plate.

Another advantageous embodiment of the fuel cell of the invention is distinguished in that the microreaction chambers are formed by irregularities in the flow field plate. For instance, the outside of the flow field plate may be roughened in the region between the flow conduits, in such a way that the reactant flows from the flow conduit into the microreaction chambers formed from irregularities of the flow field plate. The irregularities can be incorporated into the flow field plate either randomly or in a defined arrangement. Such microreaction chambers can be created for instance by roughening the flow field plate during production. It has proved advantageous if the roughness coefficient is in the range between 6 and 10.

Since the microreaction chambers do not serve to transport the reactants but instead are only the site of catalysis or combustion, it has proved advantageous if the microreaction chamber has a width between 0.1 μm and 50 μm, in particular between 1 μm and 100 μm, and especially preferably between 5 μm and 50 μm. The aforementioned widths enable both a rapid inflow of reactant into the microreaction chamber and complete conversion in the course of the electrochemical reaction.

To achieve uniform, fast conversion of the reactant at the catalyst, the catalyst, in a further advantageous variant embodiment, has a thickness and/or diameter between 0.1 nm and 100 nm, in particular between 1 nm and 50 nm. The thickness of the catalyst means the height of a layer that is made from the catalyst and is applied to a part of the microreaction chamber. If conversely the catalyst is in the form of spherical elements, these elements have a diameter in the aforementioned ranges. Depending on the reactants used, the combined and/or alternative use of a catalyst disposed in layerlike or spherical form may be advantageous. Metal catalysts in particular can easily be applied in layers on a part of the peripheral region of the microreaction chamber. The catalyst used may in particular be selected from metals of the 8th subgroup, such as platinum, palladium, or mixtures of platinum and palladium. It has been found advantageous for the catalyst to be disposed in a single-ply catalyst layer on at least a part of the peripheral region of the microreaction chamber. Applying the catalyst in a single layer in the catalyst layer is easy to do. If a larger amount of catalyst is needed to assure uniform conversion of the reactant, then in a further advantageous embodiment, the catalyst can be disposed in a multi-ply catalyst layer on at least a part of the peripheral region of the microreaction chamber.

The object of the invention can also be attained by a flow field plate for a fuel cell, having at least one outer surface and at least one flow conduit, in which the flow field plate is made from a plate material; the flow conduit is incorporated in the outer surface; and a reactant can be conducted through the flow conduit. According to the invention, it is provided that the flow field plate has at least one microreaction chamber, and the microreaction chamber is disposed in the outer surface and on the flow conduit, and a catalyst is disposed on at least a part of the microreaction chamber. Characteristics and details that are described in conjunction with the method of the invention and the flow field plate of the invention are understood to apply to the flow field plate of the invention as well.

The object of the invention can likewise be attained by a method for producing a flow field plate for use in an electrochemical fuel cell. Advantageously, the method for producing the flow field plate for use in the electrochemical fuel cell includes the following method steps:

incorporating at least one flow conduit in an outer surface of the flow field plate;

introducing at least one microreaction chamber into the flow field plate, the microreaction chamber being disposed in the outer surface of the flow field plate and on the flow conduit; and applying a catalyst on at least a part of the microreaction chamber.

For applying the catalyst, advantageously one of the following methods may be used: pulse plating, sputtering, chemical or physical deposition processes, or cathode atomization. It has also proved advantageous if the step of incorporating at least one flow conduit and/or of introducing at least one microreaction chamber is performed by at least one of the following methods: ECM (electrochemical machining), EDM (electrical discharge machining), ECDM, galvanoforming methods, chemical or physical deposition processes, CVD (chemical vapor deposition), PVD (physical vapor deposition), CFD, LIGA processes, or etching processes. The machining of the microreaction chambers and the application of the catalyst can be done either directly one after the other, or in indirect succession, for instance being separated from one another by cleaning steps. In other methods, a separately created electrode can be used for the coating, or a suitably shaped max from the coating or etching process may be used.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
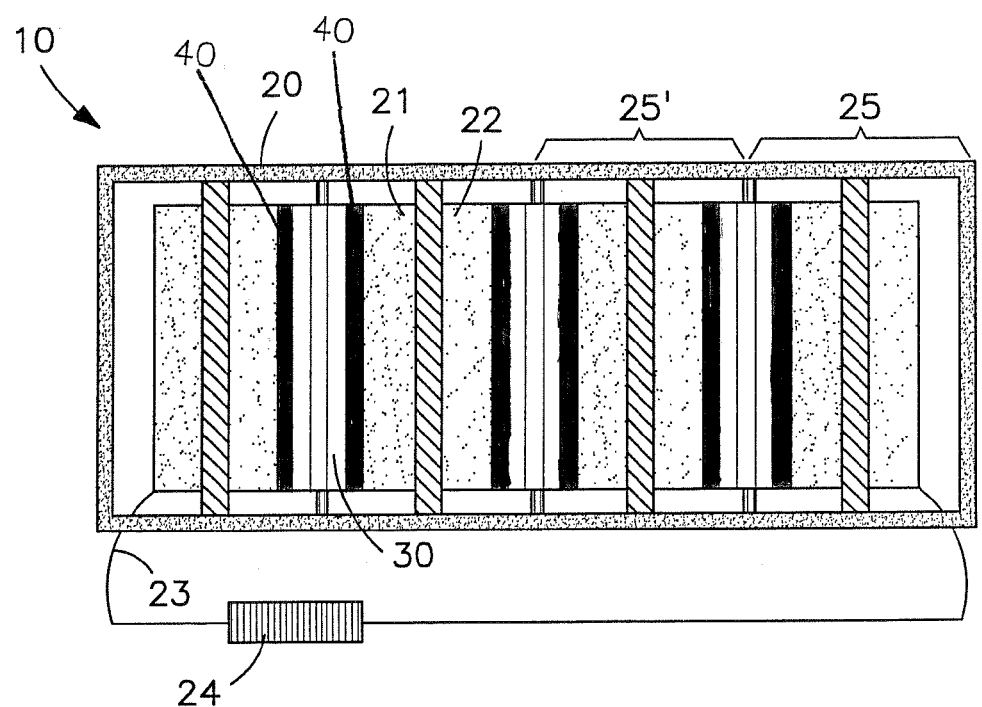
FIG. 1 shows a fuel cell of the invention.

In FIG. 1, the fuel cell 10 of the invention is shown. This fuel cell 10 is constructed of a plurality of fuel cell units 25, 25', which are disposed adjacent one another in a housing 20. Each fuel cell unit 25, 25' has a first electrode 21 and a second electrode 22. Acting on the electrodes 21, 22 with two different fuels generates an electric current by an electrochemical reaction. Since the fuel cell 10 converts chemical energy directly into electrical energy, this energy, in contrast to a combustion process, is not subject to the maximum theoretical efficiency of a Carnot process. The two fuels are often furnished in the form of two different fluids. One example of the two corresponding electrode reactions is the following:

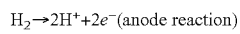

$H_2 \rightarrow 2H^+ + 2e^-$ (anode reaction)

$2H^+ + 2e^- + \frac{1}{2}O_2 \rightarrow H_2O$ (cathode reaction)

The electrical current obtained can be consumed in a load element 24. The reactant oxygen can be delivered to the fuel cell in the form of ambient air. By the serial linkage of the various fuel cell units 25, 25' by means of a line element 23.

As a result, it is possible to achieve a high voltage, which can be made available to the load element 24, such as an electric motor. To achieve a uniform distribution of the reactants on the electrodes 21, 22, at least one of the electrodes 21, 22 has a flow field plate. The flow field plate is an element, connected on one side of the electrode 21, that assures the flow of the reactant inside the fuel cell.

Figure 2:
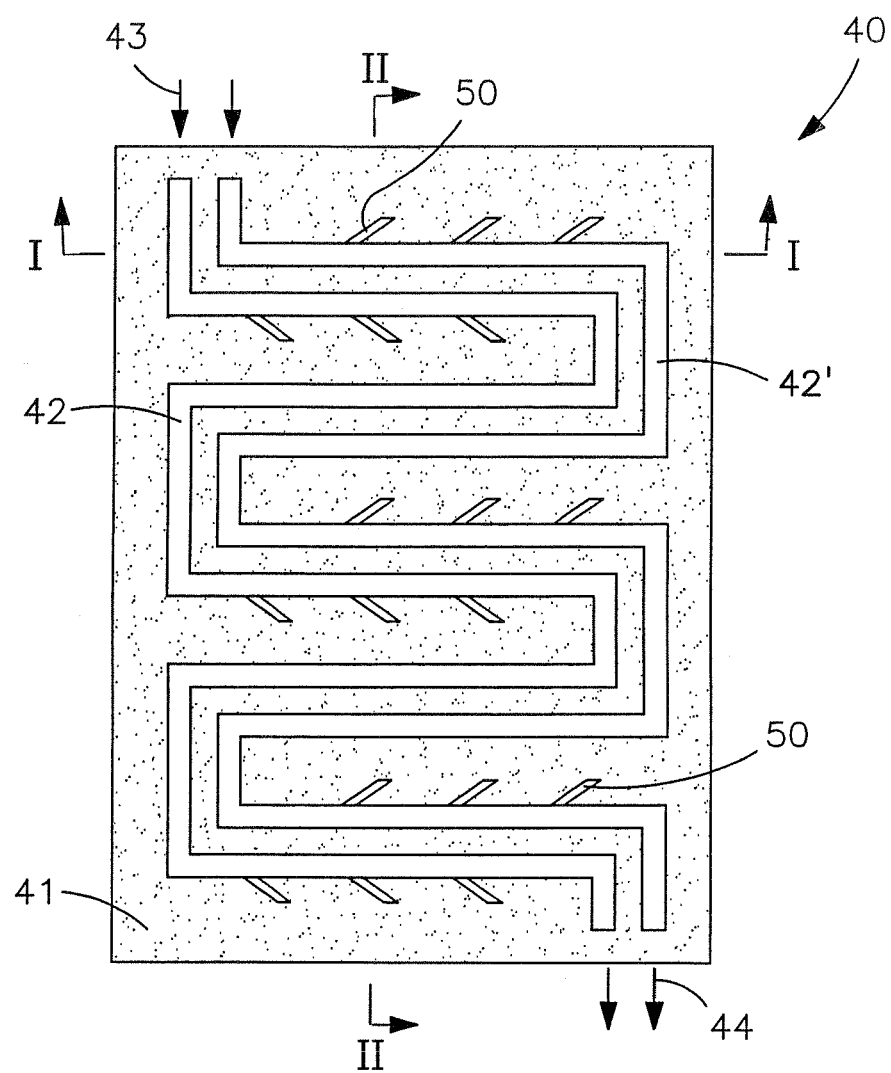
FIG. 2 shows a flow field plate of the invention, with two flow conduits.

In FIG. 2, a flow field plate 40 of the invention is shown. The flow field plate 40 serves to distribute the reactants over the active surface of the electrodes 21, 22 and thus to provide mechanical stability. To make this possible, the flow field plate 40, in the variant embodiment shown, has two flow conduits 42,42'. The two flow conduits 42,42' extend approximately in meandering fashion over an outer surface 41 of the flow field plate 40. The reactant is introduced into the flow conduit 42, 42', which the arrows 43 indicating motion are also meant to show. The reactant flowing through the flow conduit 42,42' is intended then to react electrochemically with a catalyst and thus to generate electrons and ions, so that the fuel cell 10 can generate a current. The amount of reactant introduced into the flow conduits 42, 42' is in general greater than the proportion that is converted electrochemically. Thus some of the reactant flows out of the flow conduits 42, 42' again, as the two arrows 44 are meant to show. The outflowing reactant simultaneously serves to cool the flow field plate 40 that has been heated by the exothermic reaction.

Figure 3:
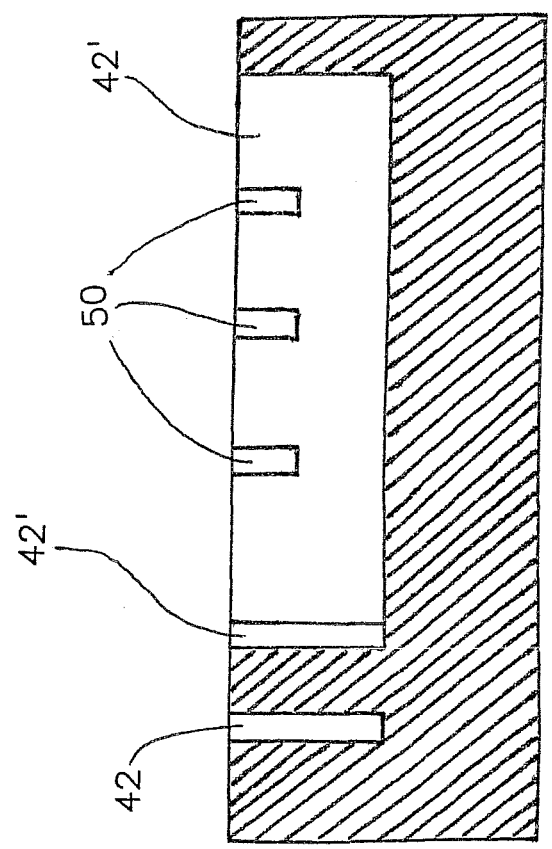
FIG. 3 is a schematic sectional view through the flow field plate in a first direction taken along lines I-I.

In FIG. 3, a section through the flow field plate 40 of the invention along the line I-I is shown. The angle of view is accordingly toward one of the walls of the flow conduit 42. Three inflow regions into three microreaction chambers 50 disposed side by side can be seen. As FIG. 2 also shows, the microreaction chambers 50 are disposed in conduitlike fashion on the side faces of the flow conduits 42, 42'. The microreaction chambers 50 are furthermore accessible from the outer surface 41 of the flow field plate 40. Consequently, on the one hand the reactant flows out of the flow conduit 42, 42' into the microreaction chamber 50. Referring to all the Figures, on the other, it is possible for the reactant flowing into the microreaction chamber 50 to come into contact with a catalyst 60 that is located on the outer surface 41 of the flow field plate. In known fuel cells, a gas diffusion element is integrated between at least one of the electrodes 21, 22 and a membrane element 30. Catalysts that enable electrochemical splitting of the reactant are often incorporated into this gas diffusion element. It has proved to be deleterious that the gas diffusion layer is often made from coarsely structured graphite fibers into which the catalyst 60 is incorporated. Since for the electrochemical conversion of the reactant, a prerequisite is simultaneous contact of the reactant with the catalyst 60 and the membrane element 30, a catalyst located in the interior of the gas diffusion layer does not lead to conversion of the reactant. As experiments have shown, in that case more than 80% of the catalyst introduced is not active. To overcome this disadvantage, the fuel cell 10 of the invention has microreaction chambers 50, in which a catalyst 60 is disposed in such a way that the catalyst 60 has simultaneous contact with the membrane element 30 and the inflowing reactant.

Figure 4:
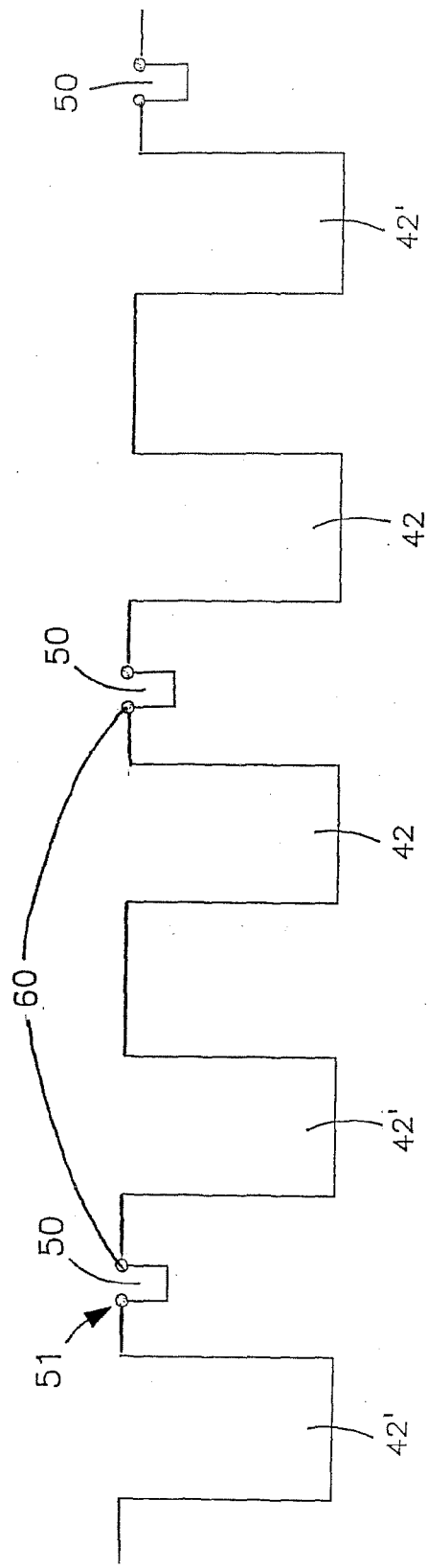
FIG. 4 is a partial schematic sectional view through the flow field plate in a second direction taken along lines II-II.

In FIG. 4, a further sectional view of the flow field plate 40 is shown, along the line II-II in FIG. 2. The view of an observer is now in the flow direction of a fluid in the flow conduits 42, 42'. Because of the V-shaped arrangement of the microreaction chambers 50 shown in FIG. 2, U-shaped cross sections of the microreaction chambers 50 can be seen in FIG. 4. The catalyst 60 is disposed on at least a part of the peripheral region 51 of the microreaction chamber 50. A reactant flowing through the microreaction chamber 50 therefore has direct contact with the catalyst 60.

Figure 5:
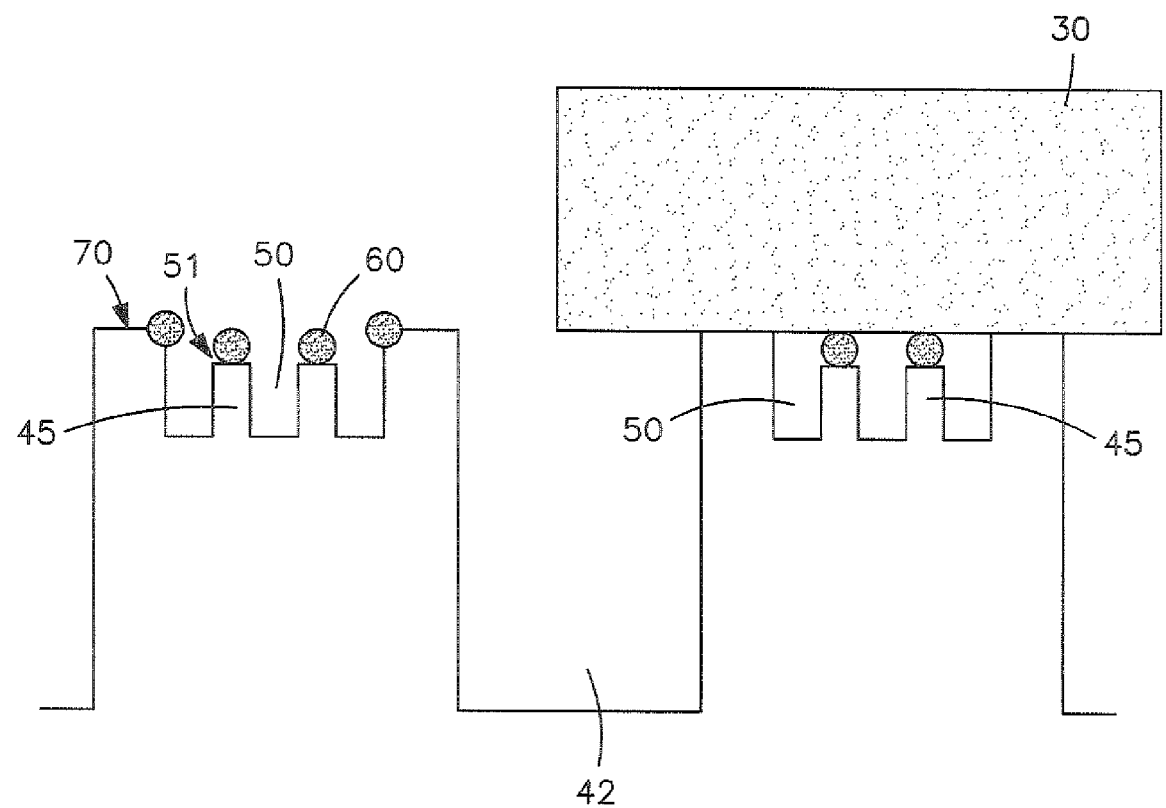
FIG. 5 is an enlarged detail of the section in FIG. 4, in a first variant embodiment.

As the catalyst 60, metals of the 8th subgroup can be used in particular. Preferably, the catalyst 60 has at least one of the following substances: platinum, palladium-coated aluminum bodies, ferrocerium, Raney nickel, platinum, rhodium, palladium, vanadium pentoxide, or samarium oxide. The catalyst 60 provides for splitting of the reactant into the electron and the ion. The electron flow occurs via the flow field plate 40 and the line element 23 into the load 24 element. In contrast to this, the ion is conducted through a membrane element 30 to the second electrode 22. The membrane element 30 is electrically insulating, so that the electron cannot pass through the membrane element 30. As FIG. 5 in particular shows, the membrane element 30 rests directly on the outer surface 41 (FIG. 3) of the flow field plate 40. A stabilizing structure 70 of the flow field plate 40 serves as the support. This stabilizing structure 70 can be disposed in the peripheral regions of the flow conduits 42, 42'. In particular, it has proved advantageous for the regions of the outer surface 41 of the flow field plate 40 that demarcate the microreaction chambers 50 from the flow conduits 42, 42' to be outfitted as a stabilizing structure 70.

In addition, a flow guide 45 may be integrated with the microreaction chambers 50. The flow guide 45 serves to assure an oncoming flow to the microreaction chamber 50 and/or to the catalyst 60. In the exemplary embodiment shown, the flow guide 45 is integrated into a bottom face of the microreaction chamber 50 and protrudes in spoilerlike fashion into it. The catalyst 60 is deposited in a peripheral region 51 of the flow guide 45. In the example shown, two flow guides 45 are integrated with the microreaction chamber 50 parallel to the walls, and each is provided with a catalyst 60. It is thus assured that the reactant flows uniformly through the microreaction chamber 50 and can come into contact with the catalyst 60.

Figure 6:
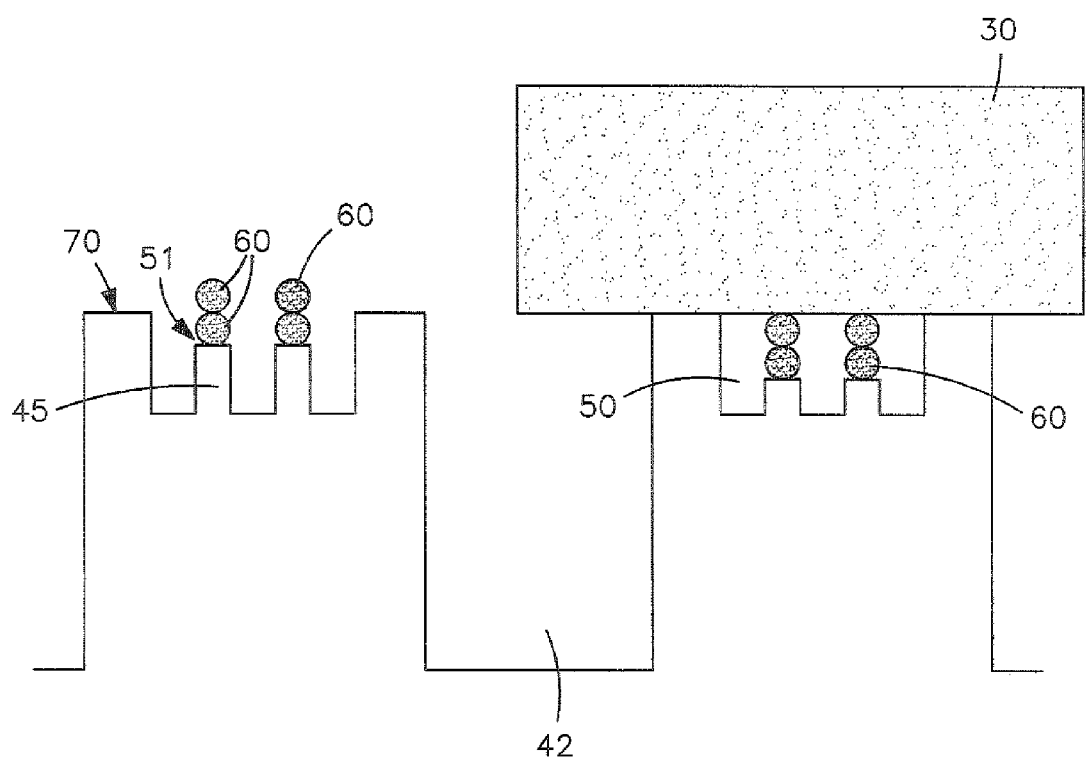
FIG. 6 is an enlarged detail of the section in FIG. 4, in a second variant embodiment.

In a further exemplary embodiment, which is shown in FIG. 6, multi-layer catalysts 60 are applied to the flow guides 45. This increases the surface area of the catalyst 60 that is available to the reactant, so that faster conversion ensues. As the right-hand part of FIG. 6 shows particularly, the catalyst 60 is in contact with the membrane element 30 and with a reactant flowing through the microreaction chamber 50. As a result, a fast reaction of the reactant in the catalyst is assured. In a fuel cell 10, the flow field plate 40 shown moreover makes it possible to dispense with a gas diffusion layer. Reaction products can be removed through the flow conduit 42, 42', and hence that reason for a gas diffusion layer is eliminated. Moreover, the catalyst is already deposited on the flow field plate 40, and thus that reason for the gas diffusion layer is eliminated as well.

The foregoing relates to preferred exemplary embodiments of the invention, it being understood that other variants and embodiments thereof are possible within the spirit and scope of the invention, the latter being defined by the appended claims.

We claim:

1. A fuel cell, comprising:
   a first electrode; a second electrode; a membrane element disposed between the first electrode and the second electrode;
   at least one of the electrodes having a flow field plate;
   at least one flow conduit, through which a reactant can be conducted, extending in and along an outer surface of the flow field plate, the flow field plate having at least one microreaction chamber disposed in the outer surface and in flow communication with the flow conduit;
   said flow field plate outer surface disposed adjacent said membrane element,
   a catalyst disposed between at least a part of the microreaction chamber and the membrane in such a way that the catalyst has contact simultaneously with the membrane element and reactant when conducted through said at least one flow conduit; and
   wherein the flow field plate has at least one flow guide, and the flow guide assures an oncoming flow to the microreaction chamber and/or the catalyst, and wherein the flow guide is disposed in the flow conduit and/or the microreaction chamber.

2. The fuel cell as defined by claim 1, wherein the catalyst is disposed on at least part of a peripheral region of the microreaction chamber.

3. The fuel cell as defined by claim 1, wherein the flow field plate has a stabilizing structure, and the stabilizing structure supports the membrane element.

4. The fuel cell as defined by claim 2, wherein the flow field plate has a stabilizing structure, and the stabilizing structure supports the membrane element.

5. The fuel cell as defined by claim 1, wherein the microreaction chamber has a width between 0.1 µm and 50 µm.

6. The fuel cell as defined by claim 1, wherein the catalyst has a thickness and/or diameter between 0.1 nm and 100 nm.

7. The fuel cell as defined by claim 1, wherein the catalyst is a single-layer catalyst.

8. The fuel cell as defined by claim 1, wherein the catalyst is a multi-layer catalyst.

* * * * *